March 23, 1954  A. E. HEIDENREICH ET AL  2,672,838
BRAZING MACHINE
Filed April 6, 1950  4 Sheets-Sheet 1

INVENTORS
Albert E. Heidenreich
Robert C. Hoffman
BY Hinkle, Horton, Ahlberg
Hansmann & Wupper
Attorneys March 23, 1954   A. E. HEIDENREICH ET AL   2,672,838
BRAZING MACHINE
Filed April 6, 1950   4 Sheets-Sheet 2
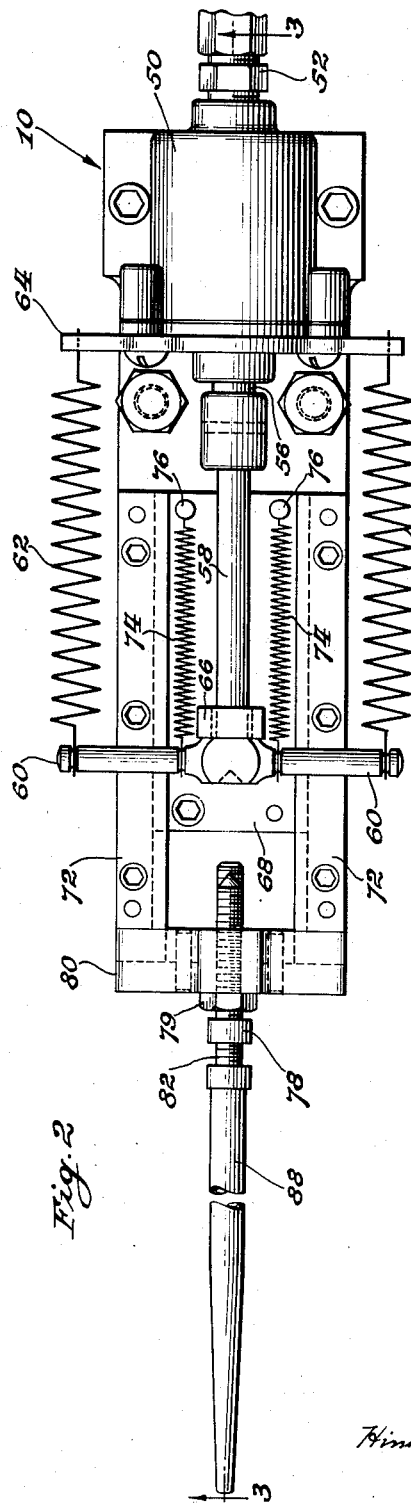
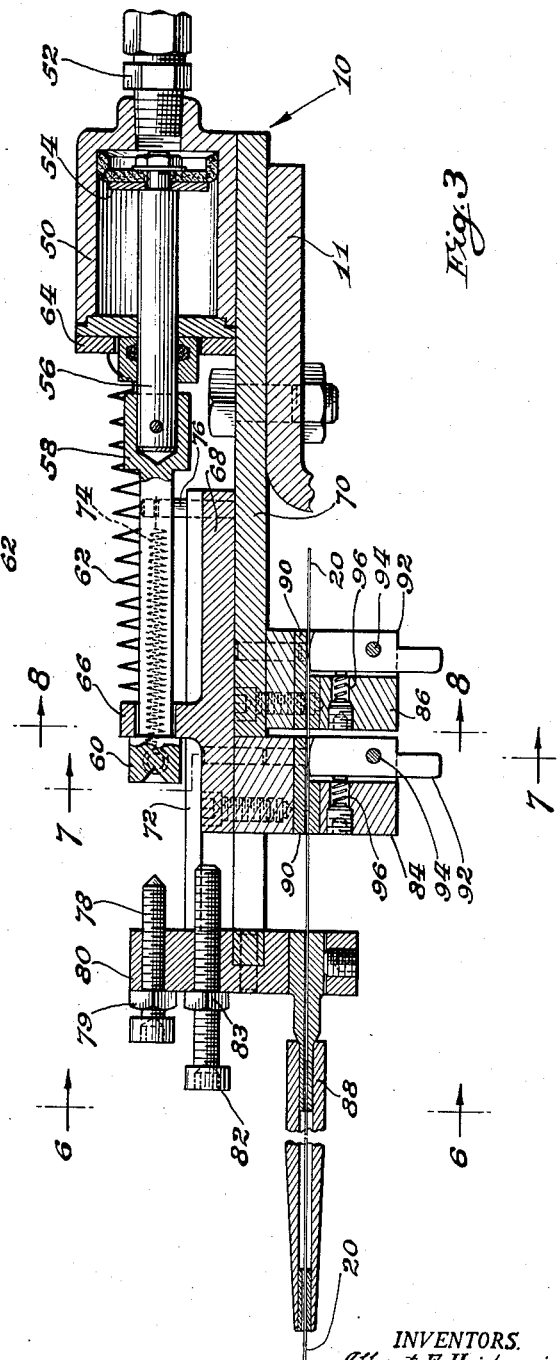
INVENTORS.
Albert E. Heidenreich
Robert C. Hoffman
BY
Hinkle, Horton, Ahlberg, Hansmann & Wupper.
Attorneys INVENTORS.
Albert E. Heidenreich
Robert C. Hoffman
BY
Hinkle, Horton, Ahlberg, Hansmann & Wupper.
Attorneys.

March 23, 1954 A. E. HEIDENREICH ET AL 2,672,838
BRAZING MACHINE
Filed April 6, 1950 4 Sheets-Sheet 4
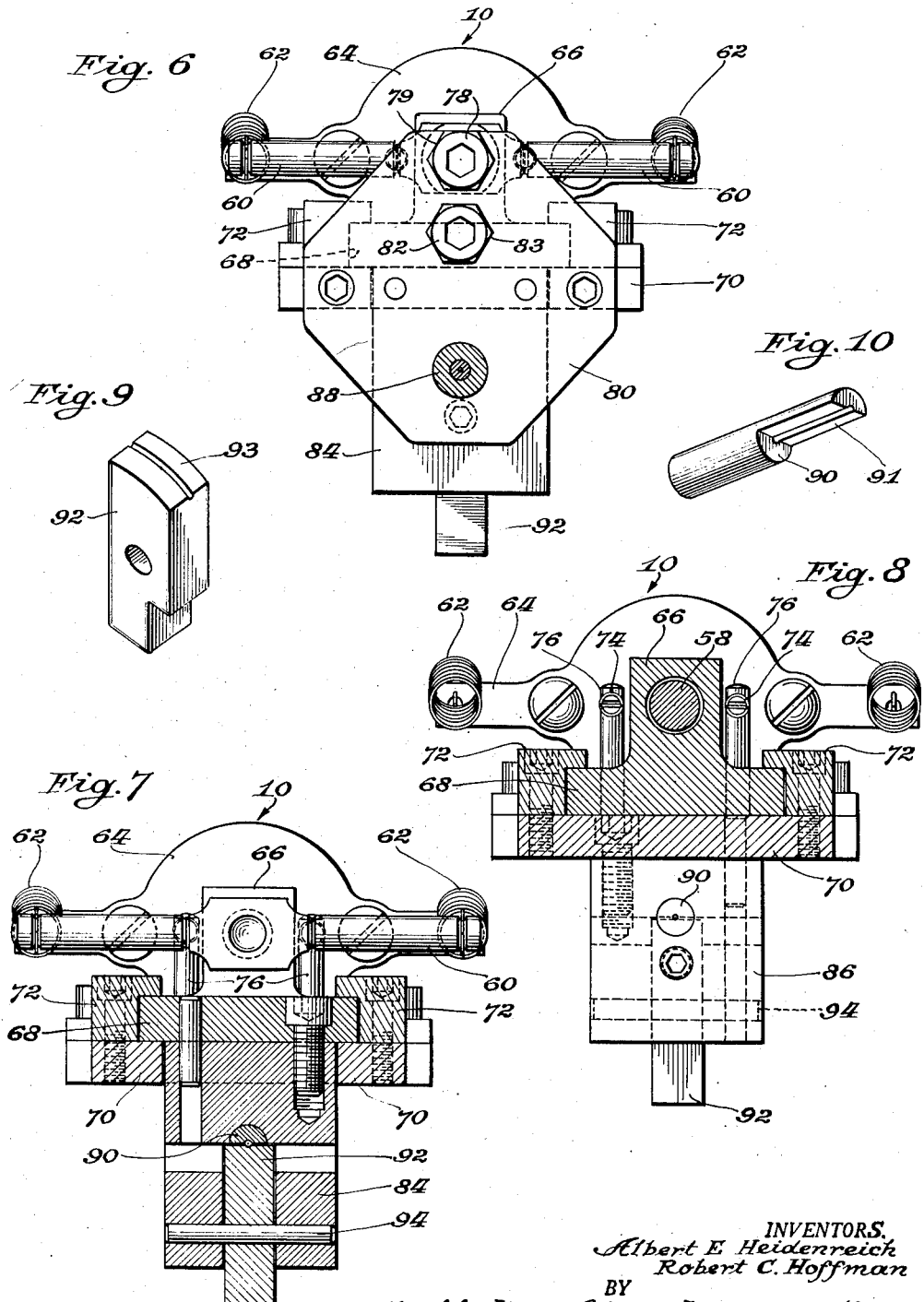
INVENTORS.
Albert E. Heidenreich
Robert C. Hoffman
BY
Hinkle, Horton, Ahlberg, Hammann & Wepper
Attorneys.

Patented Mar. 23, 1954

2,672,838

UNITED STATES PATENT OFFICE 2,672,838

BRAZING MACHINE

Albert E. Heidenreich, Maywood, and Robert C. Hoffman, Chicago, Ill., assignors to Victor Adding Machine Co., Chicago, Ill., a corporation of Illinois Application April 6, 1950, Serial No. 154,316

6 Claims. (Cl. 113—59)

1

This invention relates to power driven apparatus for feeding brazing wire. Such apparatus may form a part of an automatic brazing machine.

An object of this invention is to provide a brazing wire feeder which advances brazing wire as rapidly as it is melted during its application to a workpiece being brazed.

A further object is to provide a brazing wire feeder having means for adjustment of the wire feeding force.

A further object is to provide a wire feeder which will supply the desired amount of wire for completing each brazing operation.

A further object is to provide a wire feeder which is simple in construction and which will give reliable and efficient service.

Further objects and advantages, together with the basic principles of this invention, will become apparent from the following description of an illustrative embodiment taken with reference to the drawings, in which:

Fig. 1 is an elevational view of an automatic brazing machine which illustrates the principles of this invention;

Fig. 1-a is a fragmentary plan view of the brazing machine;

Fig. 2 is a plan view of a wire feeder forming a part of the brazing machine;

Figs. 3, 4 and 5 are elevational sectional views of the wire feeder taken on the plane 3—3 of Fig. 2 showing the wire feeder in three different stages of operation;

Fig. 6 is a sectional view taken on the plane 6—6 of Fig. 3;

Fig. 7 is a sectional view taken on the plane 7—7 of Fig. 3;

Fig. 8 is a sectional view taken on the plane 8—8 of Fig. 3; and

Figs. 9 and 10 are perspective views of the jaws of wire grips forming parts of the illustrative embodiment.

Figures 1, 1A:
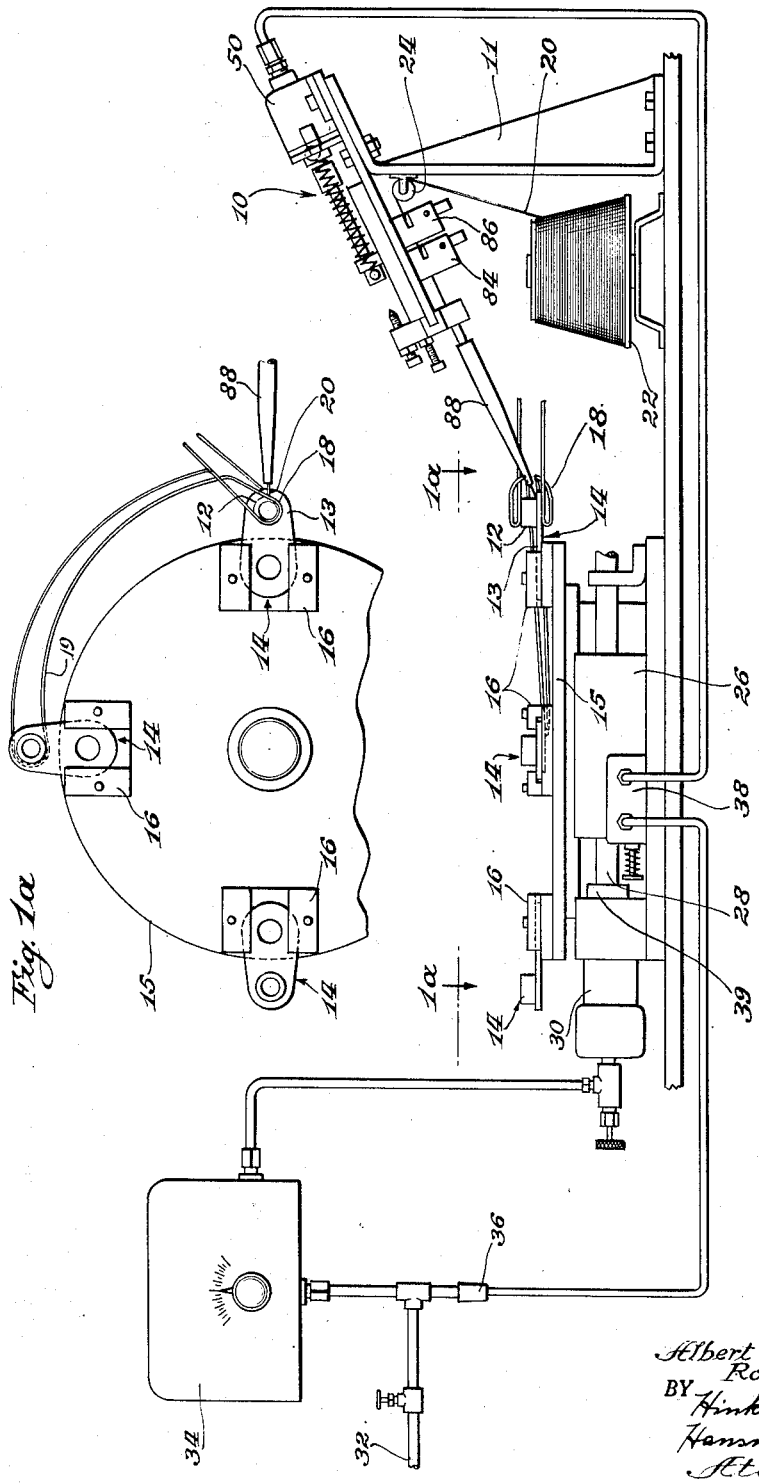

In Fig. 1 a wire feeding mechanism 10, mounted on an inclined angle on a stand 11, is arranged to cooperate with the other parts of an automatic machine for brazing together a hub 12 and an arm 13 of a workpiece 14. Four workpieces 14 are firmly held on a rotary work feeding turntable 15 by permanent magnet chucks 16 which permit rapid placement and removal of the workpieces by a machine operator. An induction heating coil 18, excited by conventional high frequency heating apparatus (not shown), is positioned to envelope the workpiece 14 which is nearest the wire feeding mechanism 10. The coil

2

18 induces high frequency electric currents into the workpiece for heating the workpiece to a brazing temperature. A smaller preheating coil or loop 19 (Fig. 1-a), which may be connected in series with the heating coil 18, is positioned adjacent a second workpiece 14 to preheat the second workpiece preparatory to the brazing operation. A brazing flux is applied to the workpieces 14 before they are heated by the preheating coil 19. The preheating coil 19 heats the workpieces to a relatively low temperature to drive off the solvent or mobile carrier of the flux and thereby to reduce scaling, which may be excessive if the workpieces are heated rapidly to the higher brazing temperature by the heating coil 18 without preheating.

Brazing wire 20 is fed from a reel 22 over a pulley 24 and through the wire feeding mechanism 10 to the workpiece 14 in brazing position. The wire 20 is melted by heat from the workpiece 14 as well as heat produced by electric currents induced in the wire 20 by the heating coil 18, and molten brazing alloy from the wire 20 flows into the joint between the hub 12 and the arm 13 by capillary action.

A mechanism 26 is provided for rotating the rotary work feeder 15 by means of a compressed air-operated reciprocating motor having a piston rod 28 extending from an air cylinder 30. The cylinder 30 is connected with an outlet 32 of a source of air pressure (not shown) by an adjustable electric timer valve mechanism 34. The wire feeding apparatus 10 is connected with the outlet 32 of the pressure source through a pressure reducer 36 and an operating valve 38 positioned for operation by a shoulder 39 on the piston rod 28.

At intervals which may be adjusted by the operator, air under pressure, supplied to the air cylinder 30 through the electric timer 34, moves the piston rod 28 to the right and indexes the rotary work feeder 15 so as to bring a new workpiece 14 into brazing position. Movement of the piston rod 28 to the right opens the wire feeder valve 38 and thus supplies air under pressure to the wire feeding mechanism 10. As disclosed below in detail, the wire feeding mechanism 10 feeds a measured amount of brazing wire 20 to the workpiece 14 as fast as the wire 20 is melted.

The wire feeder 10, with particular reference to Figs. 2 and 3, comprises an air cylinder 50 having an air inlet fitting 52, a piston 54 and a piston rod 56. A piston rod extension 58, which is pinned to the piston rod 56, supports a crossarm 60. Two return springs 62 are stretched between the ends of the cross-arm 60 and an end plate 64 secured to the cylinder 50. The piston rod extension 58 is slidably supported by an upstanding lug 66 forming a part of a slide 68 which is slidable in a slideway comprising a bed plate 70 and two overhanging side bars 72 (Figs. 7 and 8). Two tension springs 74 are stretched between the cross-arm 60 and two dowels 76 mounted in the slide 68. Bolts 78 and 82, threaded through a vertical head plate 80 (Fig. 6) secured to the bed 70, provide adjustable forward stops for the piston rod extension 58 and the slide 68, respectively, and are adapted to be locked in adjusted positions by lock nuts 79 and 83.

A wire grip or chuck 84 is secured to the underside of the slide 68, while a similar chuck or grip 86 is secured to the underside of the bed plate 70. A wire guide or nozzle 88 is mounted through the head plate 80. As shown, the wire openings in the chucks 84 and 86 and the guide 88 are in alignment. Each of the chucks 84 and 86 includes a stationary tubular jaw 90, best illustrated in Fig. 10, and a cam-shaped jaw 92, best illustrated in Fig. 9. The cam-shaped jaws 92 are rotatably mounted in the bodies of the grips 84, 86 by pivot pins 94 and are urged into engagement with the stationary jaws 90, by compression springs 96 (Figs. 3 and 7).

The front portion of each of the stationary jaws 90 is tubular to provide a guide for the wire 20. The rear portion of the jaw 90 is semitubular to provide a grooved gripping face or surface 91 (Fig. 10).

The gripping face 93 of the pivoted jaw 92 (Fig. 9) is grooved for secure gripping of the wire 20. The face 93 is not concentric with the pivot 94, but the forward portion of the face 93 is farther from the pivot 94 than the rear portion of the face 93. Consequently, clockwise (Fig. 3) tilting of the pivoted jaw 92 tightens the grip on the wire 20 and counterclockwise tilting loosens the grip so that the wire 20 may slide between the jaws 90 and 92.

Figs. 2–5 illustrate three stages in the operation of the wire feeder 10. In Figs. 2 and 3 the feeder is shown at rest, the piston 54, piston rod extension 58, cross-arm 60, and slide 68 being held in rightward positions by the return springs 62. The slide springs 74 hold the slide lug 66 against the cross-arm 60.

Figure 4:
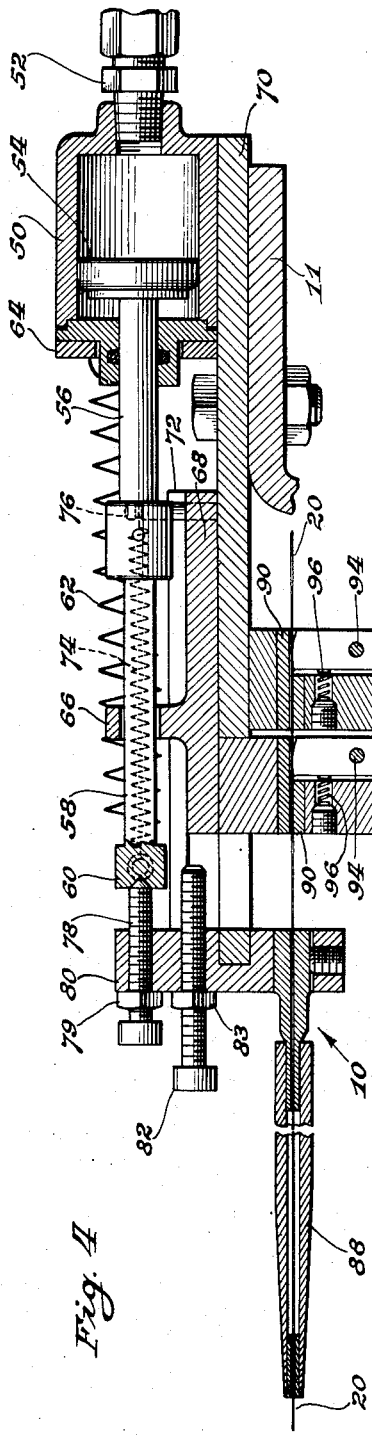
Figure 5:
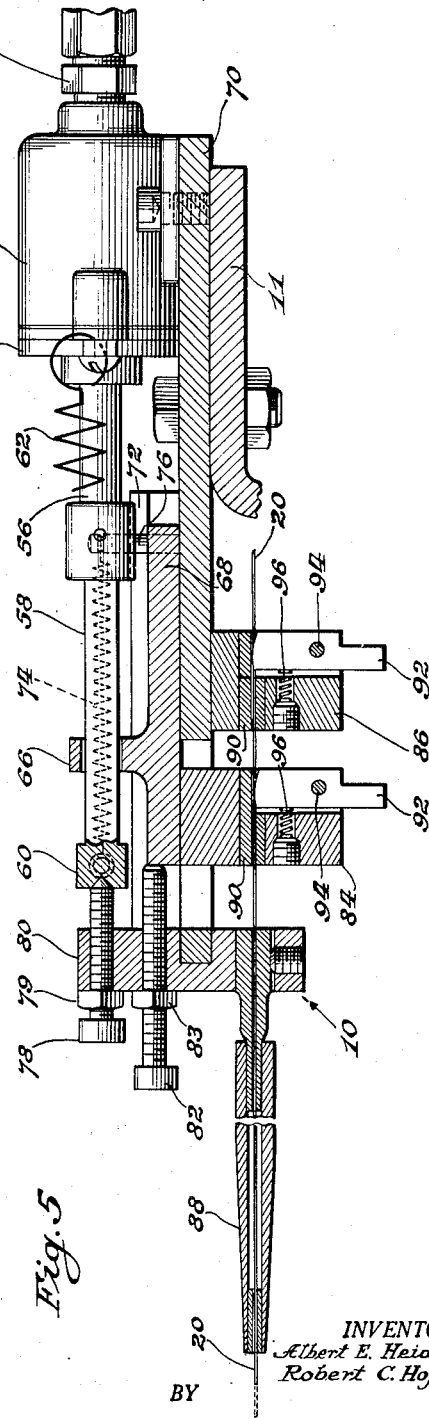

When air under pressure is supplied to the inlet 52 of the cylinder 50, the piston 54 immediately is pushed to the left against the adjustable stop 78, and the return springs 62 and the slide springs 74 are stretched, as illustrated in Fig. 4. The slide operating springs 74 tend to move the slide 68 to the left, and the wire grip 84 secured to the slide 68 may advance the wire 20 a short distance until it engages the workpiece 14 (Fig. 1). As the wire 20 is melted by the heat developed in the workpiece 14, the slide springs 74 move the slide 68 forward until the adjustable stop 82 is reached, as illustrated in Fig. 5. Thus the position of the stop bolt 82 determines the amount of wire 20 fed to the workpiece 14 for the brazing operation. The position of the other adjustable stop 78 determines the length of the stroke of the piston rod extension 58 and hence determines the wire feeding force exerted by the slide springs 74.

The wire grip 84 secured to the slide 68 grips the wire 20 when the slide 68 moves to the left, because the friction of the brazing wire 20 on the camming surface 93 of the pivoted jaw 92 and the force of the compression spring 96 combine to urge the cam jaw 92 clockwise into gripping engagement with the wire 20.

The wire grip 86 secured to the bed plate 70 permits forward motion of the wire 20 because the friction of the wire on the face 93 of the pivoted jaw 92 rotates the jaw 92 counterclockwise out of gripping engagement with the wire.

After the lapse of sufficient time for the brazing operation, the electric timer 34 (Fig. 1) releases the air pressure on the table indexing air motor cylinder 30 and permits the piston 28 to return leftward to the position illustrated in Fig. 1 out of engagement with the wire feeder valve 38. The consequent release of the air pressure on the wire feeder piston 54 permits the return springs 62 to return the piston 54 to the extreme right (Fig. 2). The cross-arm 60 engages the lug 66 on the slide 68 and returns the slide 68 rightwardly. On the return stroke of the slide 68 the wire grip 84 secured to the slide 68 slips freely over the wire 20 while the stationary wire grip 86 prevents reverse movement of the wire.

During the forward stroke of the reciprocating cross-arm 60, wire feeding force is applied to the wire grip 84 by yieldable means such as the springs 74 so that the wire grip 84 advances only as fast as the wire 20 is melted. By adjustment of the position of the stop bolt 78 the force pushing the end of the wire 20 against the workpiece 14 is made so small that there is no tendency for the wire 20 to bend or buckle.

The power driven air cylinder 50, together with the piston 54, piston rod 56, piston extension 58, cross-arm 60 and return spring 62, provide motor means for stressing the yieldable slide operating springs 74. Other equivalent power driven means may be employed if desired.

The practicability and reliability of the invention will be apparent to those skilled in the art. Of course, the basic principles of this invention may be applied by those skilled in the art to produce embodiments of the invention which may differ in their details from the specific embodiment described herein. Therefore, the details of the embodiment described herein should not be construed to limit the scope of this invention except as set forth in the appended claims, which are a complete and concise statement of the scope of this invention and are intended to include such equivalents and modifications.

We claim:

1. In a machine utilizing brazing wire to braze a heated workpiece, the combination of means including a movable wire grip to feed the wire along a predetermined path, a normally stationary work holder to support the workpiece in the path of the wire, stationary means supporting the wire grip for reciprocating movement toward and away from the workpiece, a spring engaging the wire grip to move the latter, motive means engaging the spring to stress the latter intermittently for moving the wire grip toward the workpiece and holding the end of the wire against the workpiece, the grip advancing the wire as rapidly as it is melted, means to return the wire grip after the stress on the spring is relaxed, and means engageable with the wire to hold it stationary during the return movement of the wire grip.

2. In a machine utilizing brazing wire to braze a heated workpiece, the combination of means including a movable wire grip to feed the wire along a predetermined path, a normally stationary work holder to support the workpiece in the path of the wire, stationary means supporting the wire grip for reciprocating movement toward and away from the workpiece, a reciprocable member, motive means to advance and retract the reciprocable member, a spring connecting the reciprocable member to the wire grip for moving the latter toward the workpiece when the member is advanced by the motive means, the grip advancing the wire as rapidly as it is melted, means to move the grip away from the workpiece when the member is retracted, and means to hold the wire against retraction.

3. In a machine utilizing brazing wire to braze a heated workpiece, the combination of means including a movable wire grip to feed the wire along a predetermined path, a normally stationary work holder to support the workpiece in the path of the wire, stationary means supporting the wire grip for reciprocating movement toward and away from the workpiece, a reciprocable member, motive means to advance and retract the reciprocable member, a spring connecting the reciprocable member to the wire grip for moving the latter toward the workpiece when the member is advanced by the motive means, the grip advancing the wire as rapidly as it is melted, a pair of interengageable parts on the wire grip and the movable member to retract the grip when the member is retracted, and means to hold the wire against retraction.

4. In a machine utilizing brazing wire to braze a heated workpiece, the combination of means including a movable wire grip to feed the wire along a predetermined path, a normally stationary work holder to support the workpiece in the path of the wire, stationary means supporting the wire grip for reciprocating movement toward and away from the workpiece, a reciprocable member, motive means to advance and retract the reciprocable member, a spring connecting the reciprocable member to the wire grip for moving the latter toward the workpiece when the member is advanced by the motive means, the grip advancing the wire as rapidly as it is melted, an adjustable stop limiting the travel of the grip to determine the amount of wire fed by the grip, an adjustable stop limiting the travel of the movable member to determine the amount of force exerted by the spring on the wire grip, means to return the wire grip when the member is retracted, and means to hold the wire against movement away from the workpiece.

5. In a machine utilizing brazing wire to braze a heated workpiece, a wire guide to direct the wire along a predetermined path, a normally stationary work holder to suport the workpiece in the path of the wire, a movable wire grip to feed the wire along the guide, stationary means supporting the wire grip for reciprocating movement toward and away from the workpiece, a movable member, stationary means supporting the member for reciprocating movement generally parallel with the direction of movement of the wire grip, pneumatically operated means to advance the movable member, a return spring to retract the member, an operating spring connecting the movable member to the wire grip for moving the latter toward the workpiece when the member is advanced, the wire grip advancing the wire as rapidly as it is melted, an adjustable stop limiting the travel of the wire grip to determine the amount of wire fed by the grip, an adjustable stop limiting the travel of the movable member to determine the amount of force exerted by the operating spring on the wire grip, a pair of interengageable parts respectively carried on the movable member and the wire grip to retract the grip when the movable member is retracted by the return spring, and means to hold the wire against movement away from the workpiece.

6. The combination set forth in claim 1, in which an adjustable stationary stop is provided to limit the extent of movement of the motive means toward the workpiece.

ALBERT E. HEIDENREICH.
ROBERT C. HOFFMAN.

References Cited in the file of this patent

UNITED STATES PATENTS

| Number | Name | Date |
|---|---|---|
| Re. 21,991 | Walker | Dec. 30, 1941 |
| 1,309,107 | Seidel | July 8, 1919 |
| 1,651,399 | Madden | Dec. 6, 1927 |
| 1,951,441 | Rock | Mar. 20, 1934 |
| 1,951,545 | Carson | Mar. 20, 1934 |
| 1,960,066 | Rippl | May 22, 1934 |
| 2,291,065 | Walker | July 28, 1942 |
| 2,396,799 | McCully | Mar. 19, 1946 |
| 2,433,514 | Hughey | Dec. 30, 1947 |
| 2,523,236 | Reynoldson | Sept. 19, 1950 |
| 2,628,585 | Cowles | Sept. 19, 1950 |

FOREIGN PATENTS

| Number | Country | Date |
|---|---|---|
| 496,395 | Great Britain | Nov. 30, 1938 |